(12) United States Patent
Nishikawa

(10) Patent No.: US 11,936,303 B2
(45) Date of Patent: Mar. 19, 2024

(54) POWER CONVERSION CIRCUIT INCLUDING A FIRST BRIDGE CIRCUIT AND A SECOND BRIDGE CIRUIT

(71) Applicant: FUJI ELECTRIC CO., LTD., Kawasaki (JP)

(72) Inventor: Yukihiro Nishikawa, Kodaira (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 17/233,948

(22) Filed: Apr. 19, 2021

(65) Prior Publication Data

US 2021/0399644 A1 Dec. 23, 2021

(30) Foreign Application Priority Data

Jun. 22, 2020 (JP) .................................. 2020-107078

(51) Int. Cl.
*H02M 3/335* (2006.01)
*H02M 1/38* (2007.01)

(52) U.S. Cl.
CPC ... *H02M 3/33584* (2013.01); *H02M 3/33573* (2021.05); *H02M 3/33576* (2013.01); *H02M 1/38* (2013.01)

(58) Field of Classification Search
CPC ......... H02M 3/33584; H02M 3/33573; H02M 3/33576; H02M 1/38; H02M 3/01; H02M 1/14; H02M 3/33571
See application file for complete search history.

(56) References Cited

U.S. PATENT DOCUMENTS

| | | | | |
|---|---|---|---|---|
| 4,953,068 A * | 8/1990 | Henze | ............... | H02M 3/33584 363/127 |
| 9,667,157 B1 * | 5/2017 | Dong | .................. | H03K 17/166 |
| 9,748,855 B2 * | 8/2017 | Lee | .................... | H02M 3/33592 |
| 10,079,557 B2 * | 9/2018 | Zimmanck | ........ | H02M 3/33573 |
| 11,539,300 B1 * | 12/2022 | Wu | .................... | H02M 3/33573 |
| 2003/0198064 A1 * | 10/2003 | Zhu | ................... | H02M 3/33576 363/21.01 |
| 2006/0139823 A1 * | 6/2006 | Shoji | ...................... | H02M 1/34 361/56 |

(Continued)

FOREIGN PATENT DOCUMENTS

| | | | |
|---|---|---|---|
| JP | 2005-224012 A | | 8/2005 |
| JP | 2013-230067 A | | 11/2013 |
| JP | 2015-139358 A | | 7/2015 |

OTHER PUBLICATIONS

French Patent and Trademark Office, "Office Action and Search Report for French Patent Application FR2104075," dated Nov. 25, 2022.

(Continued)

*Primary Examiner* — Yusef A Ahmed
(74) *Attorney, Agent, or Firm* — Manabu Kanesaka

(57) ABSTRACT

A power conversion device includes a controller configured to alternately turn on a second upper arm and a second lower arm of a first bridge circuit such that on-times thereof do not overlap each other to increase power stored in a resonance capacitor of the first bridge circuit in a state in which a first leg of the first bridge circuit is turned off when transmitting power from a second bridge circuit to the first bridge circuit and performing step-up operation.

8 Claims, 11 Drawing Sheets

(56) References Cited

U.S. PATENT DOCUMENTS

| | | | |
|---|---|---|---|
| 2007/0041222 A1* | 2/2007 | Eguchi | H02M 7/5387 363/17 |
| 2009/0034299 A1* | 2/2009 | Lev | H02M 3/01 363/17 |
| 2009/0059622 A1* | 3/2009 | Shimada | H02M 1/32 363/17 |
| 2010/0052423 A1* | 3/2010 | Shimada | H02M 3/33507 363/20 |
| 2012/0014138 A1* | 1/2012 | Ngo | H02M 3/33584 363/17 |
| 2013/0322128 A1* | 12/2013 | Takegami | H02M 3/33507 363/17 |
| 2014/0009968 A1* | 1/2014 | Matsuura | H02M 3/33592 363/17 |
| 2014/0062558 A1* | 3/2014 | Kinjou | H03K 5/12 327/170 |
| 2014/0104890 A1* | 4/2014 | Matsubara | H02M 3/33584 363/17 |
| 2014/0355313 A1* | 12/2014 | Nishikawa | H02M 3/33573 363/17 |
| 2015/0015181 A1* | 1/2015 | Kondo | H02M 3/33584 320/103 |
| 2015/0109827 A1* | 4/2015 | Poshtkouhi | H02M 3/33584 363/17 |
| 2015/0124490 A1* | 5/2015 | Sanuki | H02M 3/33546 363/17 |
| 2015/0138840 A1* | 5/2015 | Muto | H02M 3/3376 363/17 |
| 2015/0214847 A1* | 7/2015 | Shimada | H02M 3/01 363/17 |
| 2015/0229217 A1* | 8/2015 | Hirano | H02M 3/33507 363/17 |
| 2015/0229225 A1* | 8/2015 | Jang | H02M 3/285 363/17 |
| 2015/0291035 A1* | 10/2015 | Nagashita | H02M 1/10 307/9.1 |
| 2015/0333634 A1* | 11/2015 | Yoshida | H02M 3/33584 363/21.03 |
| 2015/0381064 A1* | 12/2015 | Matsubara | H02M 3/33584 363/17 |
| 2016/0072390 A1* | 3/2016 | Akutagawa | H02M 1/44 363/17 |
| 2016/0087545 A1* | 3/2016 | Higaki | H02M 3/33584 363/17 |
| 2016/0099646 A1* | 4/2016 | Safaee | H02M 3/33507 363/17 |
| 2016/0139651 A1* | 5/2016 | Schramm | G06F 1/3287 713/323 |
| 2016/0181925 A1* | 6/2016 | Chiang | H02M 3/33584 363/17 |
| 2016/0294294 A1* | 10/2016 | Ye | H02M 3/33592 |
| 2016/0352236 A1* | 12/2016 | Yoo | H02M 3/33584 |
| 2017/0063251 A1* | 3/2017 | Ye | H02M 3/33576 |
| 2017/0155325 A1* | 6/2017 | Shimada | H02M 3/3376 |
| 2017/0214321 A1* | 7/2017 | Li | H02J 7/34 |
| 2017/0237354 A1* | 8/2017 | Takahara | H02M 3/33546 363/17 |
| 2017/0324347 A1* | 11/2017 | Xu | H02M 3/33584 |
| 2019/0052178 A1* | 2/2019 | Ishikura | H02M 3/33592 |
| 2019/0288606 A1* | 9/2019 | Higaki | H02M 3/28 |
| 2019/0288607 A1* | 9/2019 | Zong | H02M 3/33584 |
| 2019/0372471 A1* | 12/2019 | Peng | H02M 3/33584 |
| 2020/0177089 A1* | 6/2020 | Abdel-Rahman | H02M 1/36 |
| 2020/0212816 A1* | 7/2020 | Sun | H02J 7/00 |
| 2021/0083589 A1* | 3/2021 | Dong | H01F 3/14 |
| 2021/0083590 A1* | 3/2021 | Lu | H01F 38/08 |
| 2021/0135583 A1* | 5/2021 | Ohashi | H02M 3/33573 |
| 2021/0175793 A1* | 6/2021 | Krause | H02H 9/001 |
| 2021/0359609 A1* | 11/2021 | Leirens | H02M 3/33584 |
| 2021/0359610 A1* | 11/2021 | Leirens | H02M 3/33576 |
| 2021/0359613 A1* | 11/2021 | Leirens | H02M 1/4233 |
| 2022/0077759 A1* | 3/2022 | Jeong | H02M 3/335 |
| 2022/0085725 A1* | 3/2022 | Kolar | H02M 3/01 |

OTHER PUBLICATIONS

Japan Patent Office, "Office Action for Japanese Patent Application 2020-107078," dated Dec. 5, 2023.

* cited by examiner

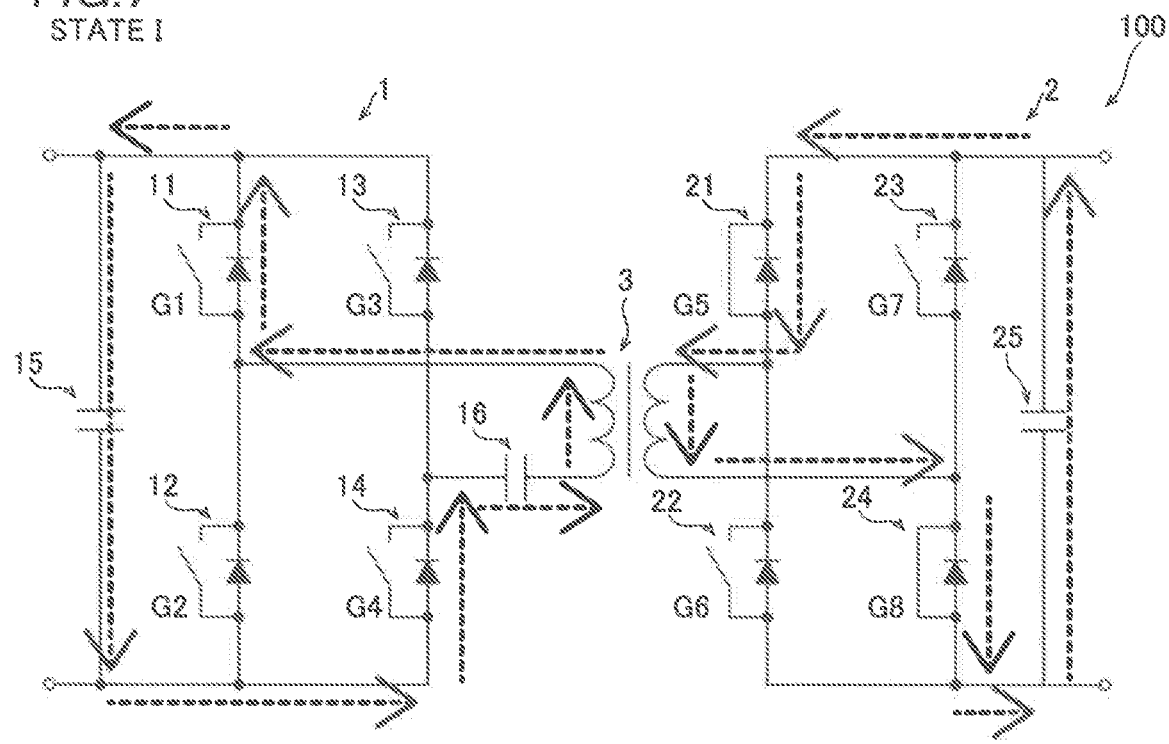
FIG.7 STATE I
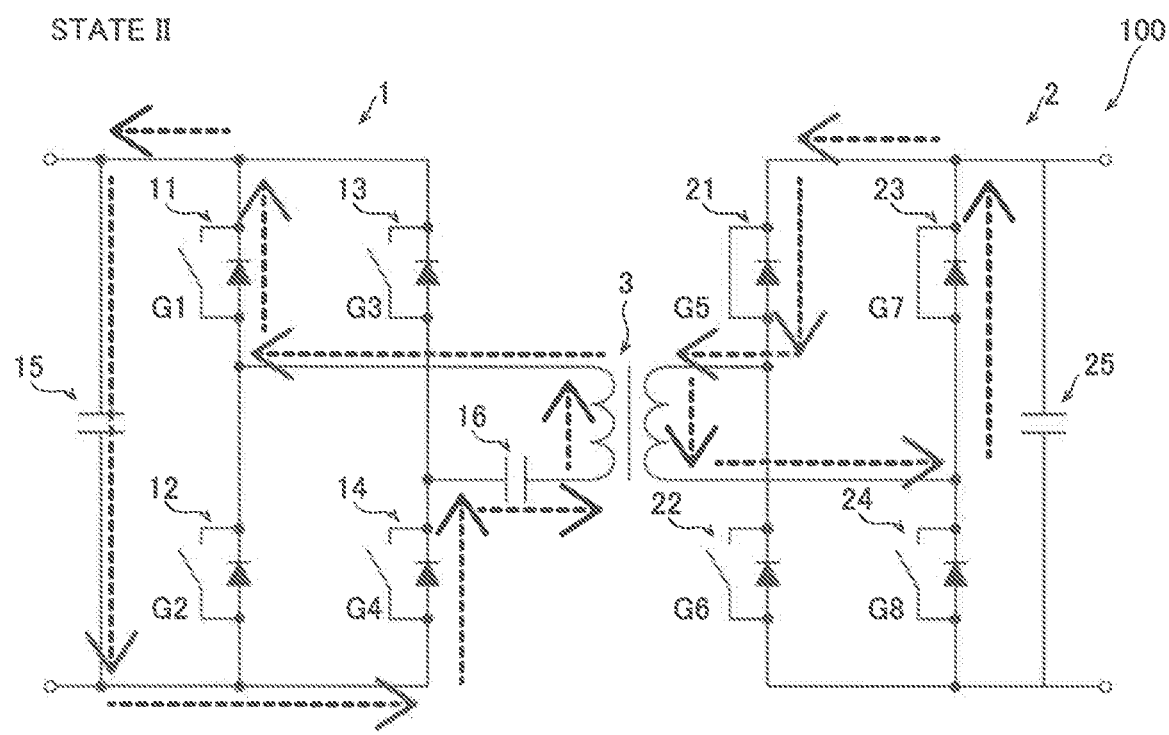
FIG.8 STATE II

STATE III

STATE IV

STATE V

STATE VI

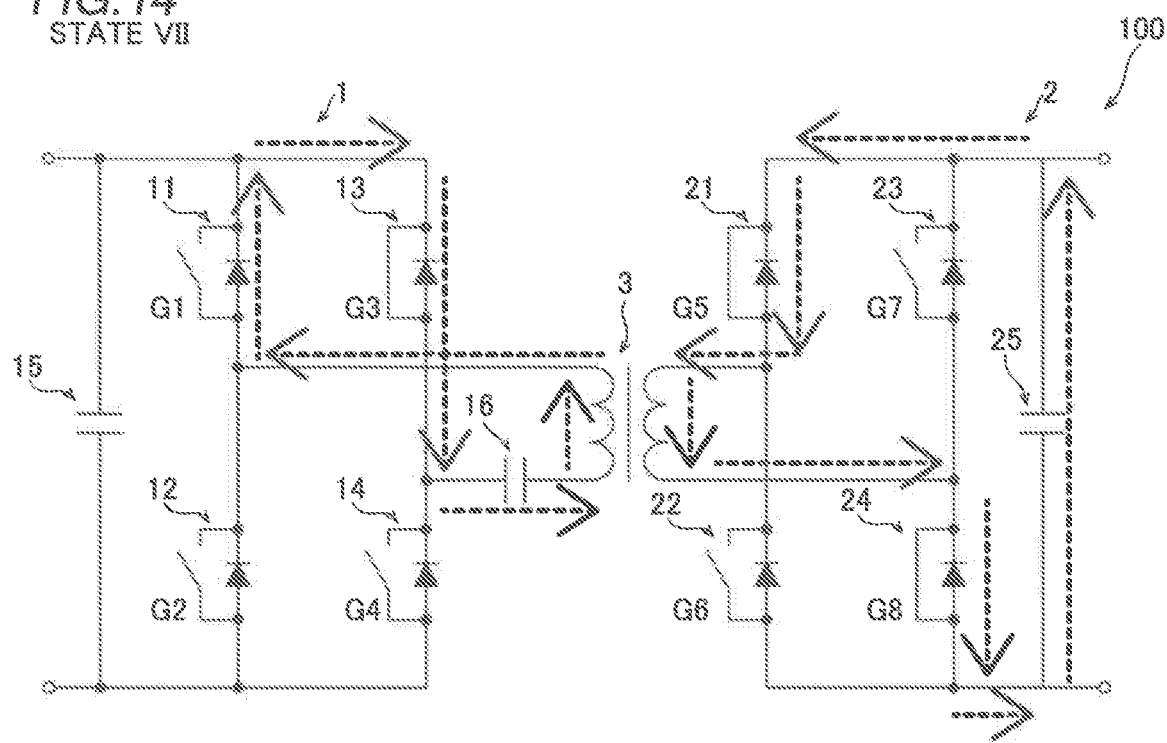
FIG.14 STATE VII
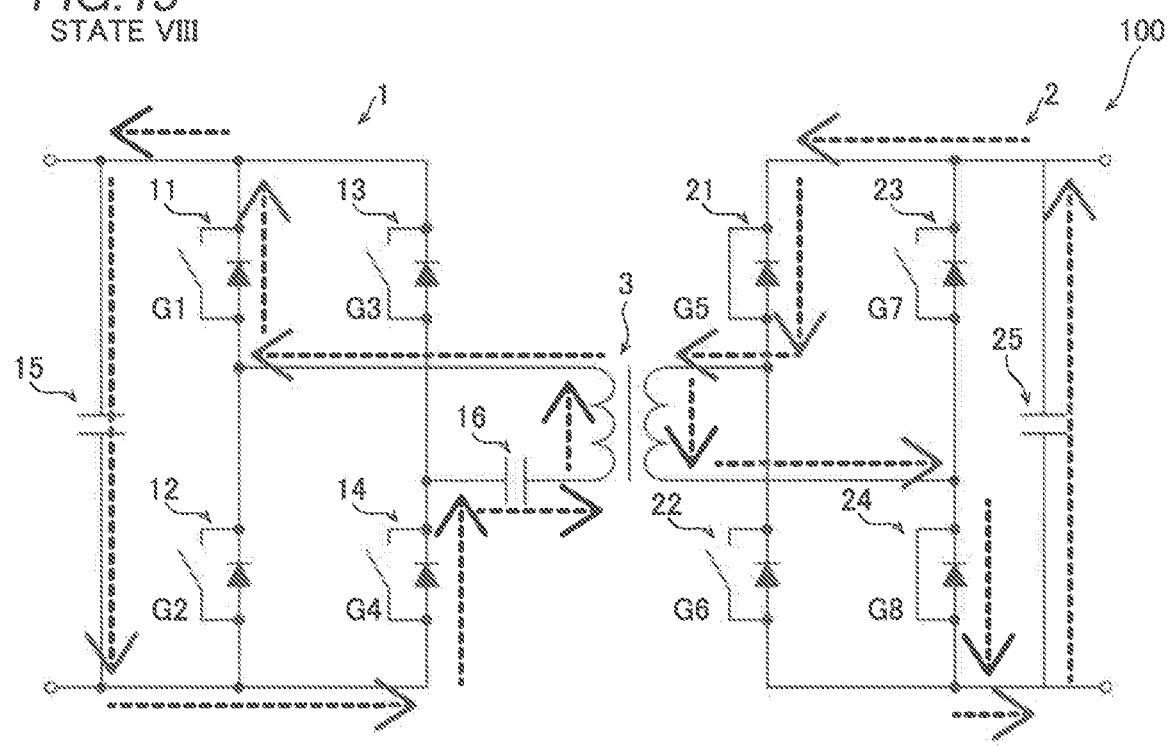
FIG.15 STATE VIII

STATE IX

STATE X

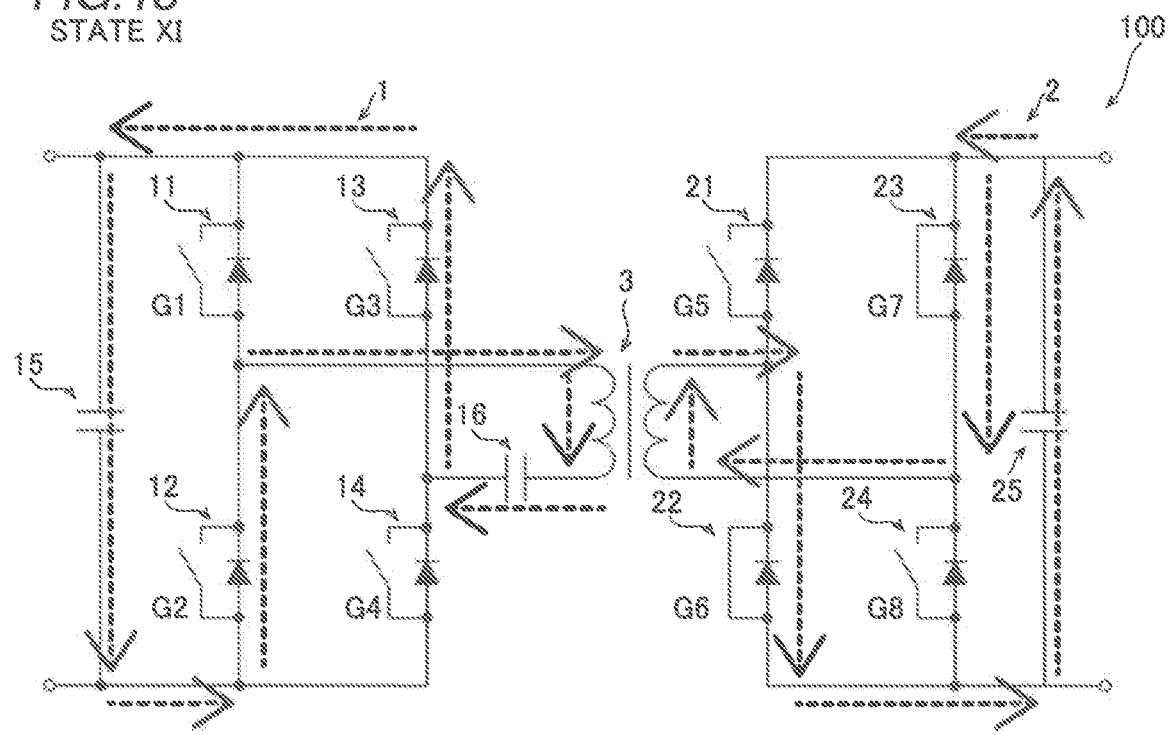
FIG.18 STATE XI
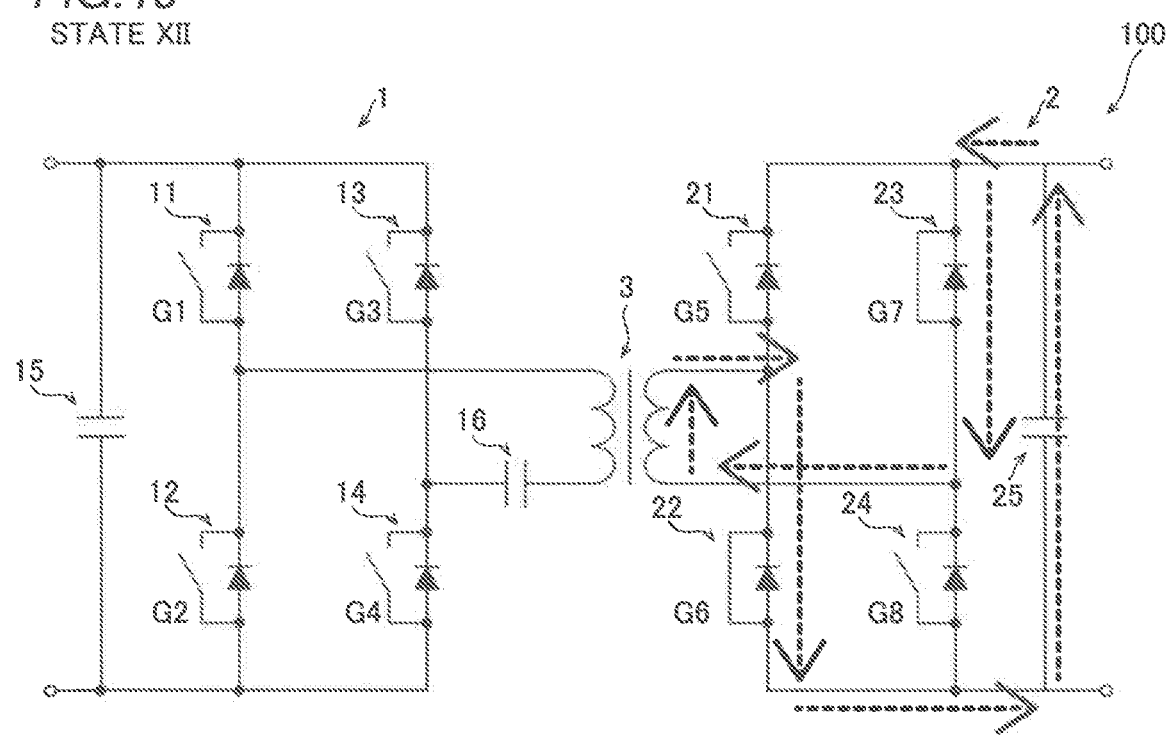
FIG.19 STATE XII

POWER CONVERSION CIRCUIT INCLUDING A FIRST BRIDGE CIRCUIT AND A SECOND BRIDGE CIRUIT

CROSS-REFERENCE TO RELATED APPLICATION

The present application claims priority of Japanese Patent Application No. 2020-107078 filed Jun. 22, 2020, the disclosure of which is hereby incorporated by reference.

BACKGROUND OF THE INVENTION

Field of the Invention

The present invention relates to a power conversion device, and more particularly, it relates to a power conversion device including a first bridge circuit and a second bridge circuit.

Description of the Background Art

A power conversion device including a first bridge circuit and a second bridge circuit is known in general, as disclosed in Japanese Patent Laid-Open No. 2013-230067, for example.

Japanese Patent Laid-Open No. 2013-230067 discloses a power conversion device including a first bridge circuit including a resonance capacitor and a second bridge circuit connected to the first bridge circuit via a transformer and including a resonance capacitor. In the power conversion device disclosed in Japanese Patent Laid-Open No. 2013-230067, a switching circuit that switches the use of the resonance capacitor of the second bridge circuit is provided in the second bridge circuit in order to perform step-up operation when power is supplied from the second bridge circuit to the first bridge circuit.

In the power conversion device disclosed in Japanese Patent Laid-Open No. 2013-230067, the resonance capacitors are provided in both the first bridge circuit and the second bridge circuit, and the switching circuit that switches the use of the resonance capacitor of the second bridge circuit is provided in the second bridge circuit in order to perform step-up operation when power is supplied from the second bridge circuit to the first bridge circuit. Therefore, it is necessary to provide the resonance capacitor and the switching circuit in the second bridge circuit, and thus the circuit configuration becomes complex.

SUMMARY OF THE INVENTION

The present invention has been proposed in order to solve the aforementioned problem, and an object of the present invention is to provide a power conversion device capable of performing step-up and step-down operation when transmitting power from a second bridge circuit to a first bridge circuit while significantly reducing or preventing a complex circuit configuration.

In order to attain the aforementioned object, a power conversion device according to an aspect of the present invention includes a first bridge circuit including a first leg including a first upper arm and a first lower arm, a second leg including a second upper arm and a second lower arm, and a resonance capacitor provided between the first leg and the second leg, a second bridge circuit connected to the first bridge circuit via a transformer, and a controller configured to control switching of the first bridge circuit and the second bridge circuit. The controller is configured to alternately turn on the second upper arm and the second lower arm of the first bridge circuit such that on-times thereof do not overlap each other to increase power stored in the resonance capacitor of the first bridge circuit in a state in which the first leg of the first bridge circuit is turned off when transmitting power from the second bridge circuit to the first bridge circuit and performing step-up operation.

As described above, the power conversion device according to this aspect of the present invention includes the controller configured to perform a control to alternately turn on the second upper arm and the second lower arm of the first bridge circuit such that the on-times thereof do not overlap each other to increase the power stored in the resonance capacitor of the first bridge circuit in a state in which the first leg of the first bridge circuit is turned off when transmitting the power from the second bridge circuit to the first bridge circuit and performing the step-up operation. Accordingly, switching of the first bridge circuit is controlled such that the step-up operation can be performed when the power is transmitted from the second bridge circuit to the first bridge circuit, and thus it is not necessary to provide the resonance capacitor and a switching circuit that switches the use of the resonance capacitor in the second bridge circuit. Consequently, the step-up operation can be performed when the power is transmitted from the second bridge circuit to the first bridge circuit while a complex circuit configuration is significantly reduced or prevented.

In the aforementioned power conversion device according to this aspect, the controller is preferably configured to control the on-time of the second upper arm of the first bridge circuit and the on-time of the second lower arm of the first bridge circuit when transmitting the power from the second bridge circuit to the first bridge circuit and performing the step-up operation. Accordingly, the on-time of the second upper arm of the first bridge circuit and the on-time of the second lower arm of the first bridge circuit are increased such that the power stored in the resonance capacitor of the first bridge circuit can be increased. Thus, the on-time of the second upper arm of the first bridge circuit and the on-time of the second lower arm of the first bridge circuit are controlled such that the value of the stepped-up voltage output from the first bridge circuit can be easily controlled.

In this case, the controller is preferably configured to adjust the on-time of the second upper arm of the first bridge circuit and the on-time of the second lower arm of the first bridge circuit based on an error between an output voltage of the first bridge circuit and a target voltage. Accordingly, the on-time of the second upper arm of the first bridge circuit and the on-time of the second lower arm of the first bridge circuit are adjusted such that the output voltage of the first bridge circuit becomes the target voltage, and thus the output voltage of the first bridge circuit can be easily brought close to the target voltage.

In the aforementioned power conversion device according to this aspect, the controller is preferably configured to, when transmitting the power from the second bridge circuit to the first bridge circuit and performing the step-up operation, turn off the second upper arm and the second lower arm of the first bridge circuit such that off-times thereof overlap each other and store the power in a smoothing capacitor provided in parallel to the first leg and the second leg of the first bridge circuit. Accordingly, excessive power accumulation in the resonance capacitor of the first bridge circuit is significantly reduced or prevented such that the stepped-up voltage output from the first bridge circuit can be easily set to a desired value.

In the aforementioned power conversion device according to this aspect, the second bridge circuit preferably includes a third leg including a third upper arm and a third lower arm, and a fourth leg including a fourth upper arm and a fourth lower arm, and the controller is preferably configured to, when transmitting the power from the second bridge circuit to the first bridge circuit and performing the step-up operation, perform a control to invert and alternately turn on and off the third upper arm and the third lower arm of the second bridge circuit and invert and alternately turn on and off the fourth upper arm and the fourth lower arm of the second bridge circuit, and to turn on the second upper arm of the first bridge circuit in synchronization with turn-on of the third upper arm and turn on the second lower arm of the first bridge circuit in synchronization with turn-on of the third lower arm. Accordingly, currents in different directions can be alternately passed through the transformer, and thus unlike a case in which a current is passed through the transformer in only one direction, the step-up operation can be performed when the power is continuously transmitted from the second bridge circuit to the first bridge circuit.

In this case, the controller is preferably configured to, when transmitting the power from the second bridge circuit to the first bridge circuit and performing the step-up operation, perform a control to set duty ratios of the third upper arm and the third lower arm of the second bridge circuit to 0.5 to invert and alternately turn on and off the third upper arm and the third lower arm, and to set duty ratios of the fourth upper arm and the fourth lower arm of the second bridge circuit to 0.5 to turn on the fourth upper arm in synchronization with the turn-on of the third lower arm and turn on the fourth lower arm in synchronization with the turn-on of the third upper arm. Accordingly, the time to pass a current through the transformer in different directions can be equal, and thus a current is passed through the transformer in a balanced manner such that the step-up operation can be stably and continuously performed.

In the aforementioned power conversion device including the second bridge circuit including the third leg and the fourth leg, the controller is preferably configured to, when transmitting the power from the second bridge circuit to the first bridge circuit and performing step-down operation, perform the step-down operation by turning on the third upper arm and the fourth upper arm of the second bridge circuit such that on-times thereof overlap each other and turning on the third lower arm and the fourth lower arm of the second bridge circuit such that on-times thereof overlap each other to decrease the power stored in the resonance capacitor of the first bridge circuit. Accordingly, switching of the first bridge circuit and switching of the second bridge circuit are controlled in both the step-up operation and the step-down operation, and thus the switching timing is controlled such that the step-up operation and the step-down operation can be seamlessly performed.

In the aforementioned power conversion device according to this aspect, the controller is preferably configured to, when transmitting the power from the second bridge circuit to the first bridge circuit and performing the step-up operation, make the on-time of the second upper arm of the first bridge circuit same as the on-time of the second lower arm of the first bridge circuit and control switching of the second upper arm and the second lower arm. Accordingly, the power stored in the resonance capacitor by turning on the second upper arm and the power stored in the resonance capacitor by turning on the second lower arm can be substantially equal to each other, and thus the step-up operation can be stably performed using the second upper arm and the second lower arm.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a circuit diagram showing a current path in the state I of the power conversion device according to the embodiment;

FIG. 8 is a circuit diagram showing a current path in the state II of the power conversion device according to the embodiment;

FIG. 14 is a circuit diagram showing a current path in the state VII of the power conversion device according to the embodiment;

FIG. 15 is a circuit diagram showing a current path in the state VIII of the power conversion device according to the embodiment;

FIG. 18 is a circuit diagram showing a current path in the state XI of the power conversion device according to the embodiment; and FIG. 19 is a circuit diagram showing a current path in the state XII of the power conversion device according to the embodiment.

DESCRIPTION OF THE PREFERRED EMBODIMENTS

Embodiments of the present invention are hereinafter described with reference to the drawings.

The configuration of a power conversion device 100 according to the embodiment is now described with reference to FIGS. 1 to 5.

Figure 1:
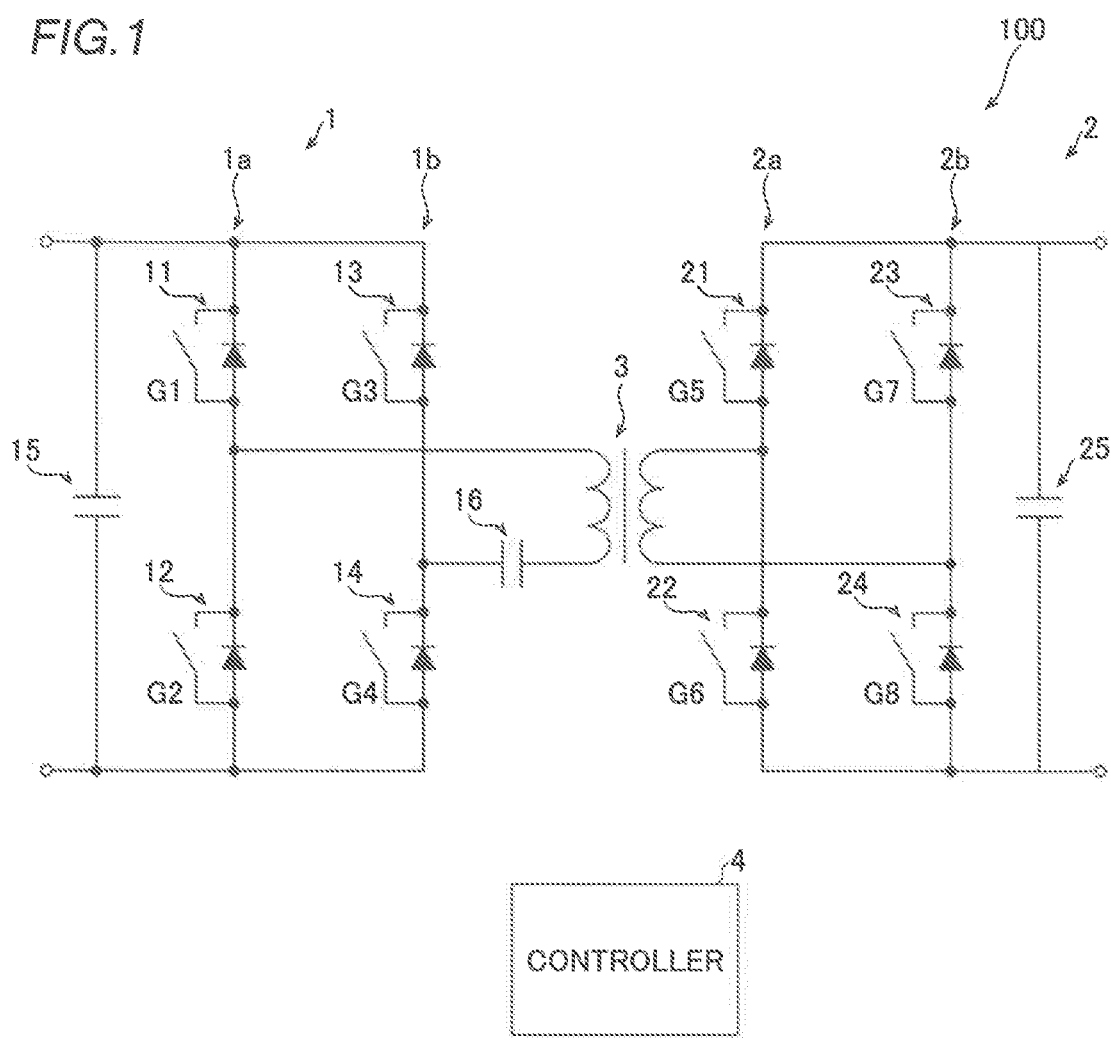
FIG. 1 is a diagram showing the configuration of a power conversion device according to an embodiment.

As shown in FIG. 1, the power conversion device 100 converts the voltage of supplied DC power and outputs the DC power. The power conversion device 100 is mounted on an electric vehicle, for example. The electric vehicle on which the power conversion device 100 is mounted runs by driving a motor with power charged in a battery. The electric vehicle is connected to an external power supply via a connector and converts power with the power conversion device 100 such that the battery can be charged from the external power supply. The electric vehicle can supply the power of the battery to electric equipment in the vehicle. The electric vehicle can convert the power of the battery with the power conversion device 100 and supply commercial power (100V/200V AC power) to a house or the like externally connected.

As shown in FIG. 1, the power conversion device 100 includes a first bridge circuit 1, a second bridge circuit 2, a transformer 3, and a controller 4. The first bridge circuit 1 includes a first leg 1a including a first upper arm 11 and a first lower arm 12, and a second leg 1b including a second upper arm 13 and a second lower arm 14. The first bridge circuit 1 includes a smoothing capacitor 15 provided in parallel to the first leg 1a and the second leg 1b. The first bridge circuit 1 includes a resonance capacitor 16 provided between the first leg 1a and the second leg 1b.

The second bridge circuit 2 includes a third leg 2a including a third upper arm 21 and a third lower arm 22, and a fourth leg 2b including a fourth upper arm 23 and a fourth lower arm 24. The second bridge circuit 2 includes a smoothing capacitor 25 provided in parallel to the third leg 2a and the fourth leg 2b. The second bridge circuit 2 is connected to the first bridge circuit 1 via the transformer 3.

Each arm (the first upper arm 11, the first lower arm 12, the second upper arm 13, and the second lower arm 14) of the first bridge circuit 1 and each arm (the third upper arm 21, the third lower arm 22, the fourth upper arm 23, and the fourth lower arm 24) of the second bridge circuit 2 include a switching element. The switching element switches (switches between an on-state and an off-state) based on a gate signal from the controller 4. When the switching element is in the on-state, a current can flow in both a first direction and a second direction, and when the switching element is in the off-state, a current can flow in only the first direction (from the bottom to the top in FIG. 1).

The power conversion device 100 is a bi-directional power conversion device capable of performing operation to input power to the first bridge circuit 1, convert the power, and output the power from the second bridge circuit 2, and operation to input power to the second bridge circuit 2, convert the power, and output the power from the first bridge circuit 1. Specifically, in the power conversion device 100, when the battery is charged, the first bridge circuit 1 is connected to the external power supply via an inverter capable of performing bi-directional operation, and the second bridge circuit 2 is connected to the battery. That is, the power conversion device 100 converts DC power supplied to the first bridge circuit 1 and outputs the DC power from the second bridge circuit 2 when the battery is charged. In the power conversion device 100, when the battery is discharged, the first bridge circuit 1 is connected to external equipment via an inverter capable of performing bi-directional operation, and the second bridge circuit 2 is connected to the battery. That is, the power conversion device 100 converts DC power supplied from the battery to the second bridge circuit 2 and output the DC power from the first bridge circuit 1 when the battery is discharged.

The transformer 3 is insulatingly connected to the first bridge circuit 1 and the second bridge circuit 2. The transformer 3 converts the voltage in the first bridge circuit 1 and the voltage in the second bridge circuit 2. The transformer 3 includes a primary winding on the first bridge circuit 1 side and a secondary winding on the second bridge circuit 2 side. The ratio of the number of turns of the primary winding to the number of turns of the secondary winding is n:1. That is, n represents the ratio of the number of turns of the primary winding to the number of turns of the secondary winding.

The controller 4 controls switching of the first bridge circuit 1 and the second bridge circuit 2. That is, the controller 4 is configured to perform a control to turn on and off each arm (the first upper arm 11, the first lower arm 12, the second upper arm 13, the second lower arm 14, the third upper arm 21, the third lower arm 22, the fourth upper arm 23, and the fourth lower arm 24) based on a gate signal.

The controller 4 includes a microcontroller that processes signals, for example. Specifically, the controller 4 includes an integrated circuit including an arithmetic processor and a memory.

Figure 2:
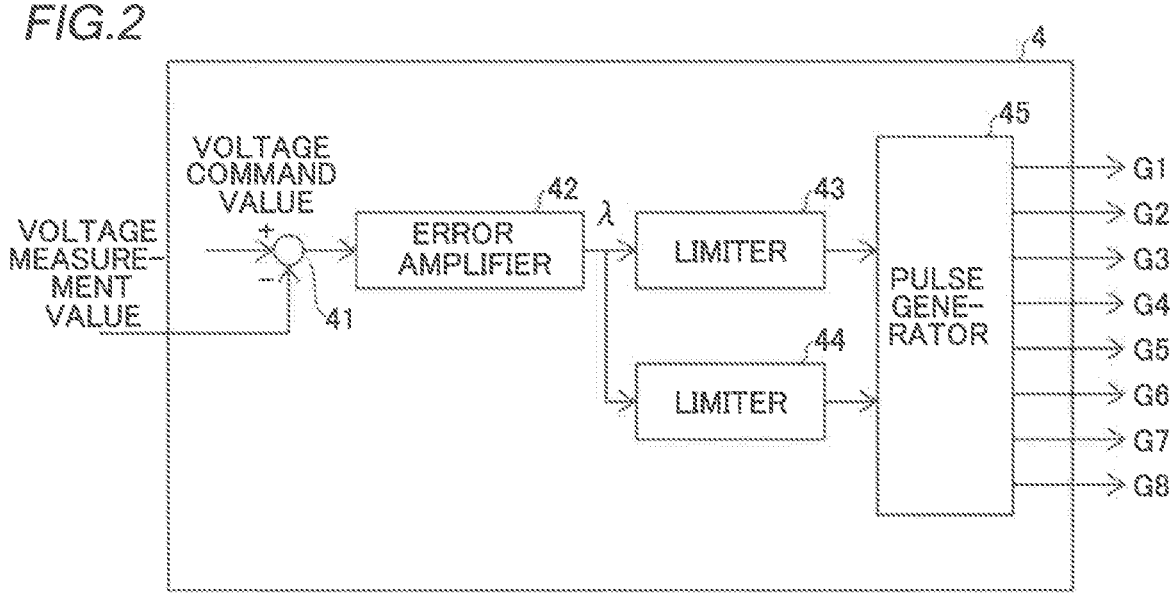
FIG. 2 is a block diagram showing the configuration of a controller of the power conversion device according to the embodiment.

As shown in FIG. 2, the controller 4 includes a subtractor 41, an error amplifier 42, a limiter 43, a limiter 44, and a pulse generator 45 as control configurations. The controller 4 is configured to output a gate signal based on an output voltage and a voltage command value (target voltage) to control switching of the first bridge circuit 1 and the second bridge circuit 2.

The subtractor 41 of the controller 4 subtracts a voltage measurement value (output voltage value) from the voltage command value and inputs an error to the error amplifier 42. When power is input to the first bridge circuit 1 and is output from the second bridge circuit 2, a voltage value on the second bridge circuit 2 side is used as the voltage measurement value. When power is input to the second bridge circuit 2 and is output from the first bridge circuit 1, a voltage value on the first bridge circuit 1 side is used as the voltage measurement value.

The error amplifier 42 amplifies and processes the error input from the subtractor 41, and calculates a control amount $\lambda$ in the range of 0 or more and 1 or less. Furthermore, the error amplifier 42 outputs the calculated control amount $\lambda$ to the limiters 43 and 44.

Figure 3:
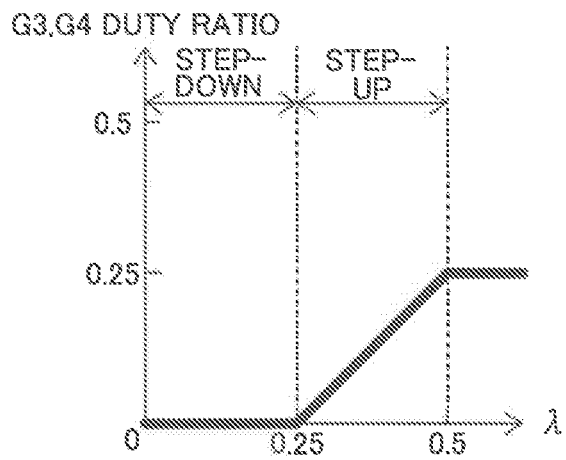
FIG. 3 is a diagram showing the relationship between a control amount $\lambda$ and duty ratios of a second upper arm and a second lower arm of the power conversion device according to the embodiment.
Figure 4:
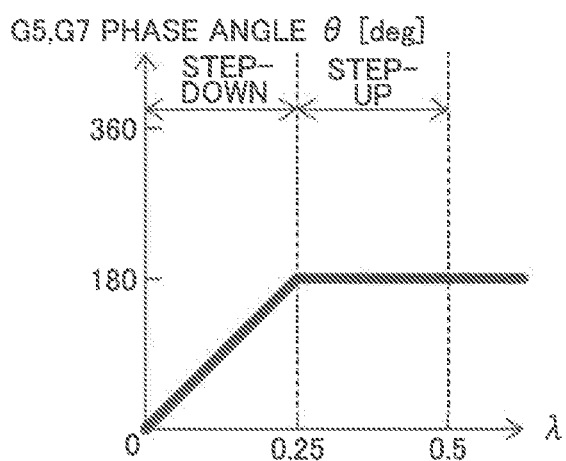
FIG. 4 is a diagram showing the relationship between the control amount $\lambda$ and the phase angle misalignment of a fourth upper arm with respect to a third upper arm of the power conversion device according to the embodiment.

When the control amount $\lambda$ is 0 or more and less than 0.25, the limiter 43 outputs, to the pulse generator 45, a signal to control duty ratios of the second upper arm 13 and the second lower arm 14 to be 0, as shown in FIG. 3. When the control amount $\lambda$ is 0 or more and less than 0.25, the limiter 43 outputs, to the pulse generator 45, a signal to control the phase angle misalignment of the fourth upper arm 23 with respect to the third upper arm 21 to be in the range of 0 degrees to 180 degrees, as shown in FIG. 4.

When the control amount $\lambda$ is 0.25 or more and 0.5 or less, the limiter 44 outputs, to the pulse generator 45, a signal to control the duty ratios of the second upper arm 13 and the second lower arm 14 to be in the range of 0 to 0.25, as shown in FIG. 3. When the control amount λ is 0.25 or more and 0.5 or less, the limiter 43 outputs, to the pulse generator 45, a signal to control the phase angle misalignment of the fourth upper arm 23 with respect to the third upper arm 21 to be 180 degrees, as shown in FIG. 4.

The pulse generator 45 generates gate signals to be transmitted to gates G1, G2, G3, G4, G5, G6, G7, and G8 of the first upper arm 11, the first lower arm 12, the second upper arm 13, the second lower arm 14, the third upper arm 21, the third lower arm 22, the fourth upper arm 23, and the fourth lower arm 24, respectively, based on the signals output from limiters 43 and 44.

Figure 5:
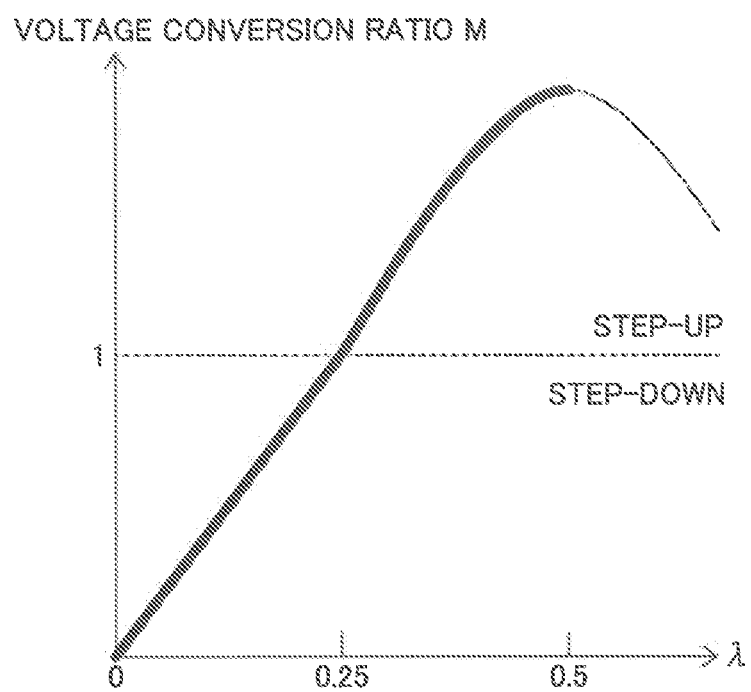
FIG. 5 is a diagram showing the relationship between the control amount $\lambda$ and a voltage conversion ratio M of the power conversion device according to the embodiment.

As shown in FIG. 5, when the control amount λ is 0 or more and less than 0.25, a voltage conversion ratio M is less than 1, and step-down operation is performed. When the control amount λ is more than 0.25 and less than 0.5, the voltage conversion ratio M is more than 1, and step-up operation is performed. The voltage conversion ratio M is expressed by a formula, M=(ratio n of the number of turns of the winding)×(output voltage)/(input voltage).

When transmitting power from the second bridge circuit 2 to the first bridge circuit 1, the controller 4 controls the first bridge circuit 1 on the rectifying side, which is provided with the resonance capacitor 16, to perform voltage doubler rectification operation and to regenerate and return surplus energy to the power supply side (second bridge circuit 2 side) and perform the step-up operation in order to obtain a predetermined voltage value. Furthermore the controller 4 controls the second bridge circuit 2 on the power supply side, which is not provided with a resonance capacitor, to perform phase shift operation within the range of the voltage conversion ratio at which the surplus energy cannot be regenerated and returned.

Thus, even when the power output from the battery with relatively large voltage fluctuations is output to the outside, the voltage can be stepped up in a wide range, and thus the output voltage can be controlled to be constant. Consequently, even when the input voltage from the battery fluctuates more than expected, DC power with a stable voltage can be output, and thus the reliability of the device can be improved.

The controller 4 is configured to control the input power such that the output voltage becomes constant and to convert the power. That is, the controller 4 performs a feedback control such that the voltage of the output power becomes constant while monitoring the voltage value of the output power.

In this embodiment, the controller 4 is configured to perform a control to alternately turn on the second upper arm 13 and the second lower arm 14 of the first bridge circuit 1 such that on-times thereof do not overlap each other to increase power stored in the resonance capacitor 16 of the first bridge circuit 1 in a state in which the first leg 1a of the first bridge circuit 1 is turned off when transmitting power from the second bridge circuit 2 to the first bridge circuit 1 and performing the step-up operation.

The controller 4 is configured to control the on-time of the second upper arm 13 of the first bridge circuit 1 and the on-time of the second lower arm 14 of the first bridge circuit 1 when transmitting power from the second bridge circuit 2 to the first bridge circuit 1 and performing the step-up operation.

The controller 4 is configured to adjust the on-time of the second upper arm 13 of the first bridge circuit 1 and the on-time of the second lower arm 14 of the first bridge circuit 1 based on the error between the output voltage of the first bridge circuit 1 and the target voltage.

The controller 4 is configured to, when transmitting power from the second bridge circuit 2 to the first bridge circuit 1 and performing the step-up operation, turn off the second upper arm 13 and the second lower arm 14 of the first bridge circuit 1 such that off-times thereof overlap each other and store power in the smoothing capacitor 15 provided in parallel to the first leg 1a and the second leg 1b of the first bridge circuit 1.

The controller 4 is configured to, when transmitting power from the second bridge circuit 2 to the first bridge circuit 1 and performing the step-up operation, perform a control to invert and alternately turn on and off the third upper arm 21 and the third lower arm 22 of the second bridge circuit 2 and invert and alternately turn on and off the fourth upper arm 23 and the fourth lower arm 24 of the second bridge circuit 2, and to turn on the second upper arm 13 of the first bridge circuit 1 in synchronization with the turn-on of the third upper arm 21 and turn on the second lower arm 14 of the first bridge circuit 1 in synchronization with the turn-on of the third lower arm 22.

The controller 4 is configured to, when transmitting power from the second bridge circuit 2 to the first bridge circuit 1 and performing the step-up operation, perform a control to set the duty ratios of the third upper arm 21 and the third lower arm 22 of the second bridge circuit 2 to 0.5 to invert and alternately turn on and off the third upper arm 21 and the third lower arm 22, and to set the duty ratios of the fourth upper arm 23 and the fourth lower arm 24 of the second bridge circuit 2 to 0.5 to turn on the fourth upper arm 23 in synchronization with the turn-on of the third lower arm 22 and turn on the fourth lower arm 24 in synchronization with the turn-on of the third upper arm 21.

The controller 4 is configured to, when transmitting power from the second bridge circuit 2 to the first bridge circuit 1 and performing the step-down operation, perform the step-down operation by turning on the third upper arm 21 and the fourth upper arm 23 of the second bridge circuit 2 such that on-times thereof overlap each other and turning on the third lower arm 22 and the fourth lower arm 24 of the second bridge circuit 2 such that on-times thereof overlap each other to decrease the power stored in the resonance capacitor 16 of the first bridge circuit 1.

The controller 4 is configured to, when transmitting power from the second bridge circuit 2 to the first bridge circuit 1 and performing the step-up operation, make the on-time of the second upper arm 13 of the first bridge circuit 1 same as the on-time of the second lower arm 14 of the first bridge circuit 1 and control switching of the second upper arm 13 and the second lower arm 14.

When power transmitting power from the first bridge circuit 1 to the second bridge circuit 2, the controller 4 performs a pulse frequency modulation control and a phase shift control to step up and down the input voltage and output the power.

(Step-Down Operation)

A case in which the power conversion device 100 performs the step-down operation when transmitting power from the second bridge circuit 2 to the first bridge circuit 1 is now described with reference to FIGS. 6 to 12.

Figure 6:
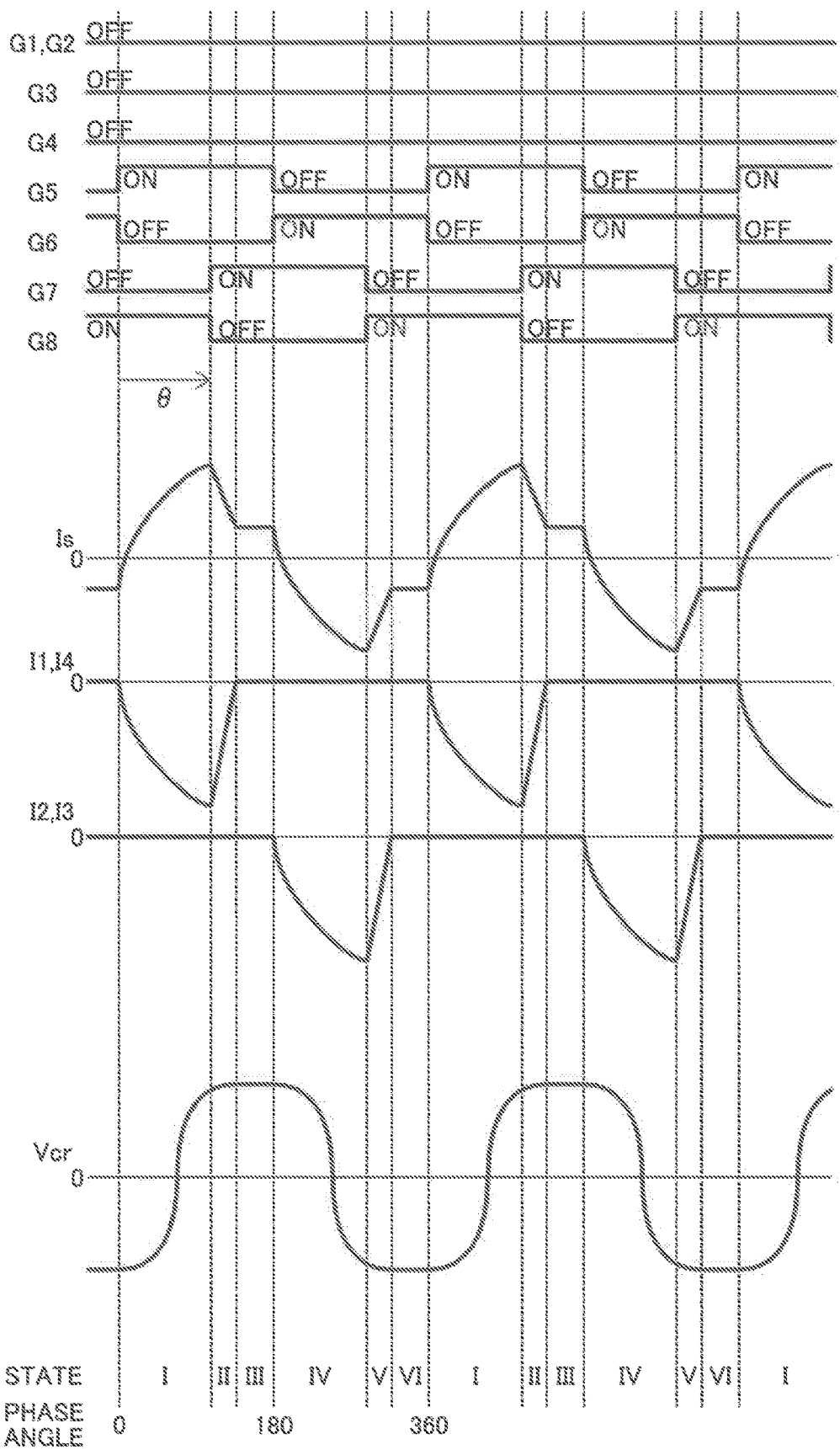
FIG. 6 is a time chart for illustrating the operation of the power conversion device at the time of stepping down a voltage according to the embodiment.

As shown in FIG. 6, in the step-down operation, the first upper arm 11, the first lower arm 12, the second upper arm 13, and the second lower arm 14 of the first bridge circuit 1 are all turned off. That is, the gates G1, G2, G3, and G4 are constantly turned off. The third upper arm 21 and the third lower arm 22 are alternately turned on and off at a duty ratio of 0.5. That is, the gate G5 is turned on when the phase angle is from 0 degrees to 180 degrees, and is turned off when the phase angle is from 180 degrees to 360 degrees (=0 degrees). The gate G6 is turned off when the phase angle is from 0 degrees to 180 degrees, and is turned on when the phase angle is from 180 degrees to 360 degrees (=0 degrees).

The fourth upper arm 23 and the fourth lower arm 24 are alternately turned on and off at a duty ratio of 0.5. The fourth upper arm 23 is turned on and off with a delay of a shift amount θ with respect to the third upper arm 21. The fourth lower arm 24 is turned on and off with a delay of a shift amount θ with respect to the third lower arm 22. That is, the gate G7 is turned on when the phase angle is from θ to 180 degrees+θ, and is turned off when the phase angle is from 180 degrees+θ to 360 degrees+θ (=θ degrees). The gate G8 is turned off when the phase angle is from 0 to 180 degrees+θ, and is turned on when the phase angle is from 180 degrees+θ to 360 degrees+θ (=θ degrees).

The shift amount θ is reduced such that the time during which the turn-on of the third upper arm 21 and the turn-on of the fourth upper arm 23 (the turn-on of the third lower arm 22 and the turn-on of the fourth lower arm 24) overlap each other becomes longer. As the time during which the turn-ons overlap each other becomes longer, a voltage applied to the transformer 3 is 0 for a longer time, and thus the output voltage becomes smaller.

As shown in FIG. 7, in a state I, the first bridge circuit 1 is a current circuit in which a current passes through the transformer 3, the first upper arm 11, the smoothing capacitor 15, the second lower arm 14, and the resonance capacitor 16. The second bridge circuit 2 is a current circuit in which a current passes through the transformer 3, the fourth lower arm 24, the smoothing capacitor 25, and the third upper arm 21. In this case, as shown in FIG. 6, a current Is that flows through the second bridge circuit 2 increases. A current I1 that flows through the first upper arm 11 and a current I4 that flows through the second lower arm 14 decrease. A current I2 that flows through the first lower arm 12 and a current I3 that flows through the second upper arm 13 are 0. The voltage Vcr of the resonance capacitor 16 increases.

As shown in FIG. 8, in a state II, the first bridge circuit 1 is a current circuit in which a current passes through the transformer 3, the first upper arm 11, the smoothing capacitor 15, the second lower arm 14, and the resonance capacitor 16. The second bridge circuit 2 is a current circuit in which a current passes through the transformer 3, the fourth upper arm 23, and the third upper arm 21. In this case, as shown in FIG. 6, the current Is that flows through the second bridge circuit 2 decreases. The current I1 that flows through the first upper arm 11 and the current I4 that flows through the second lower arm 14 increase. The current I2 that flows through the first lower arm 12 and the current I3 that flows through the second upper arm 13 are 0.

Figure 9:
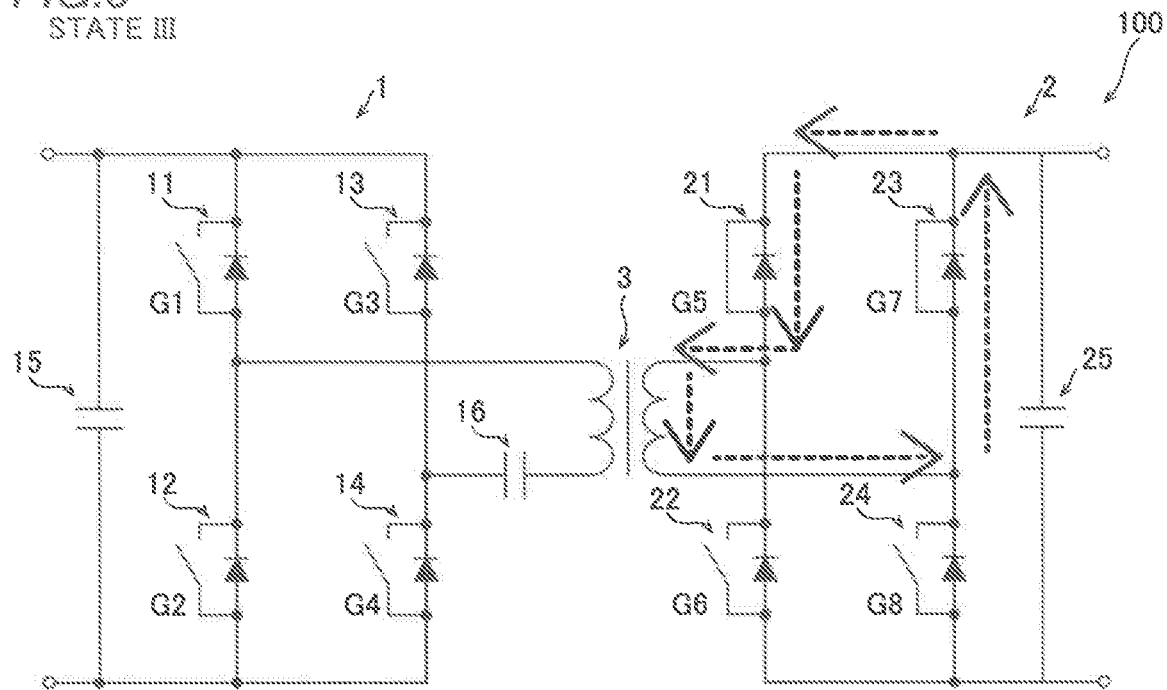
FIG. 9 is a circuit diagram showing a current path in the state III of the power conversion device according to the embodiment.

As shown in FIG. 9, in a state III, no current flows through the first bridge circuit 1. The second bridge circuit 2 is a current circuit in which a current passes through the transformer 3, the fourth upper arm 23, and the third upper arm 21. In this case, as shown in FIG. 6, the current Is that flows through the second bridge circuit 2 is constant. The current I1 that flows through the first upper arm 11 and the current I4 that flows through the second lower arm 14 are 0. The current I2 that flows through the first lower arm 12 and the current I3 that flows through the second upper arm 13 are 0. The voltage Vcr of the resonance capacitor 16 is constant.

Figure 10:
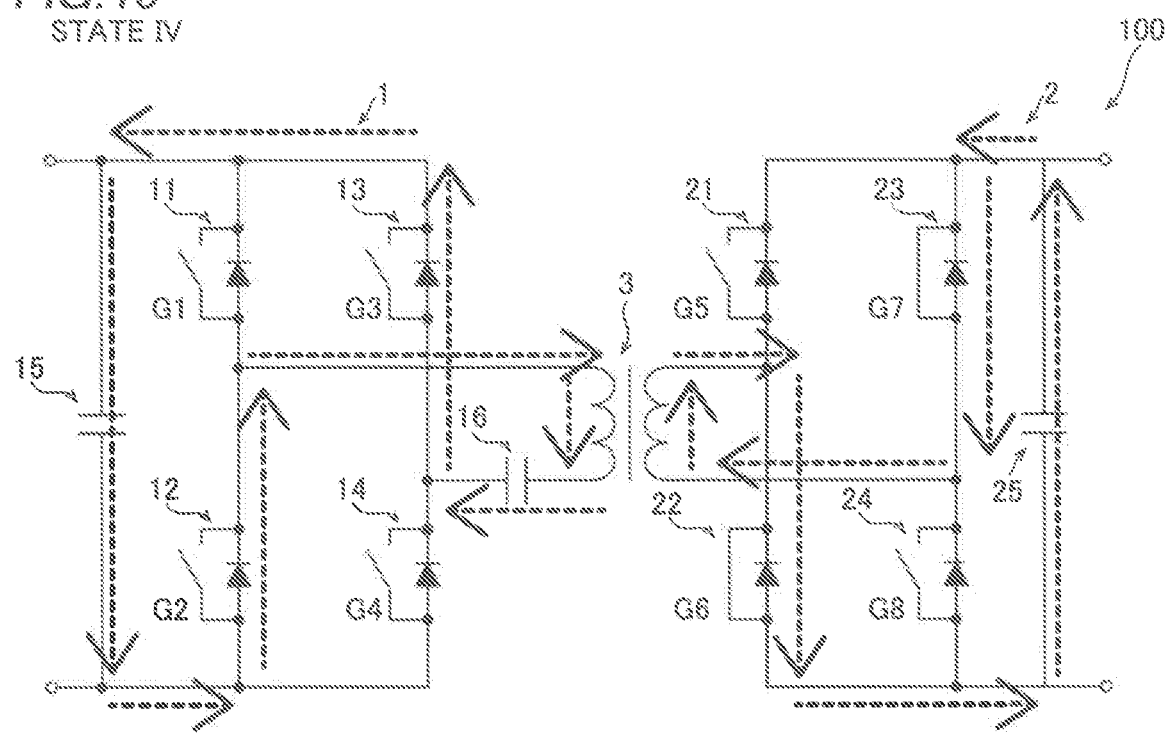
FIG. 10 is a circuit diagram showing a current path in the state IV of the power conversion device according to the embodiment.

As shown in FIG. 10, in a state IV, the first bridge circuit 1 is a current circuit in which a current passes through the transformer 3, the resonance capacitor 16, the second upper arm 13, the smoothing capacitor 15, and the first lower arm 12. The second bridge circuit 2 is a current circuit in which a current passes through the transformer 3, the third lower arm 22, the smoothing capacitor 25, and the fourth upper arm 23. In this case, as shown in FIG. 6, the current Is that flows through the second bridge circuit 2 decreases. The current I1 that flows through the first upper arm 11 and the current I4 that flows through the second lower arm 14 are 0. The current I2 that flows through the first lower arm 12 and the current I3 that flows through the second upper arm 13 decrease. The voltage Vcr of the resonance capacitor 16 decreases.

Figure 11:
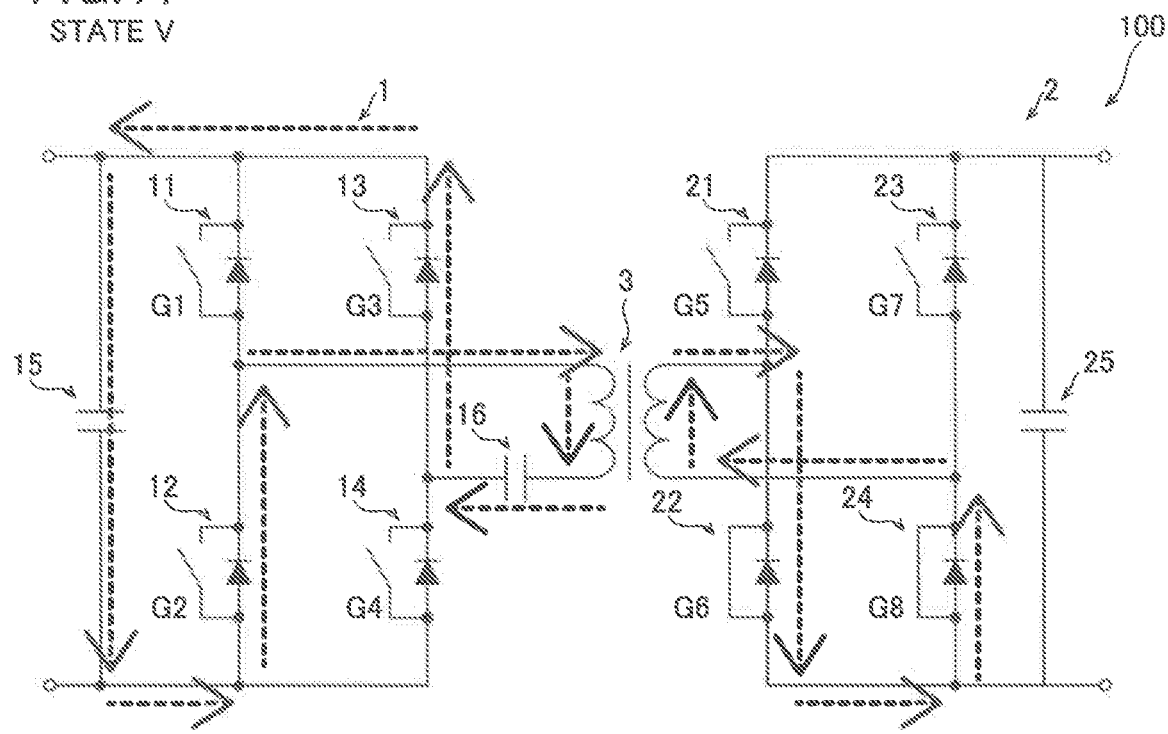
FIG. 11 is a circuit diagram showing a current path in the state V of the power conversion device according to the embodiment.

As shown in FIG. 11, in a state V, the first bridge circuit 1 is a current circuit in which a current passes through the transformer 3, the resonance capacitor 16, the second upper arm 13, the smoothing capacitor 15, and the first lower arm 12. The second bridge circuit 2 is a current circuit in which a current passes through the transformer 3, the third lower arm 22, and the fourth lower arm 24. In this case, as shown in FIG. 6, the current Is that flows through the second bridge circuit 2 increases. The current I1 that flows through the first upper arm 11 and the current I4 that flows through the second lower arm 14 are 0. The current I2 that flows through the first lower arm 12 and the current I3 that flows through the second upper arm 13 increase.

Figure 12:
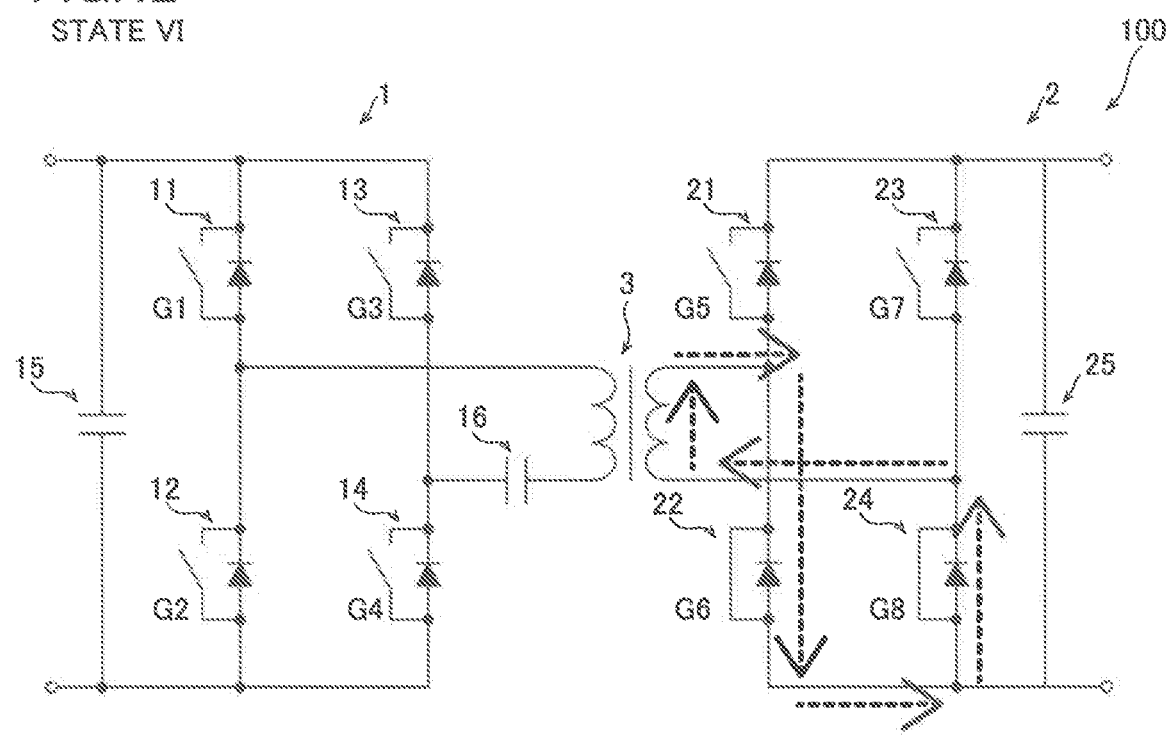
FIG. 12 is a circuit diagram showing a current path in the state VI of the power conversion device according to the embodiment.

As shown in FIG. 12, in a state VI, no current flows through the first bridge circuit 1. The second bridge circuit 2 is a current circuit in which a current passes through the transformer 3, the third lower arm 22, and the fourth lower arm 24. In this case, as shown in FIG. 6, the current Is that flows through the second bridge circuit 2 is constant. The current I1 that flows through the first upper arm 11 and the current I4 that flows through the second lower arm 14 are 0. The current I2 that flows through the first lower arm 12 and the current I3 that flows through the second upper arm 13 are 0. The voltage Vcr of the resonance capacitor 16 is constant.

(Step-Up Operation)

A case in which the power conversion device 100 performs the step-up operation when transmitting power from the second bridge circuit 2 to the first bridge circuit 1 is now described with reference to FIGS. 13 to 19.

Figure 13:
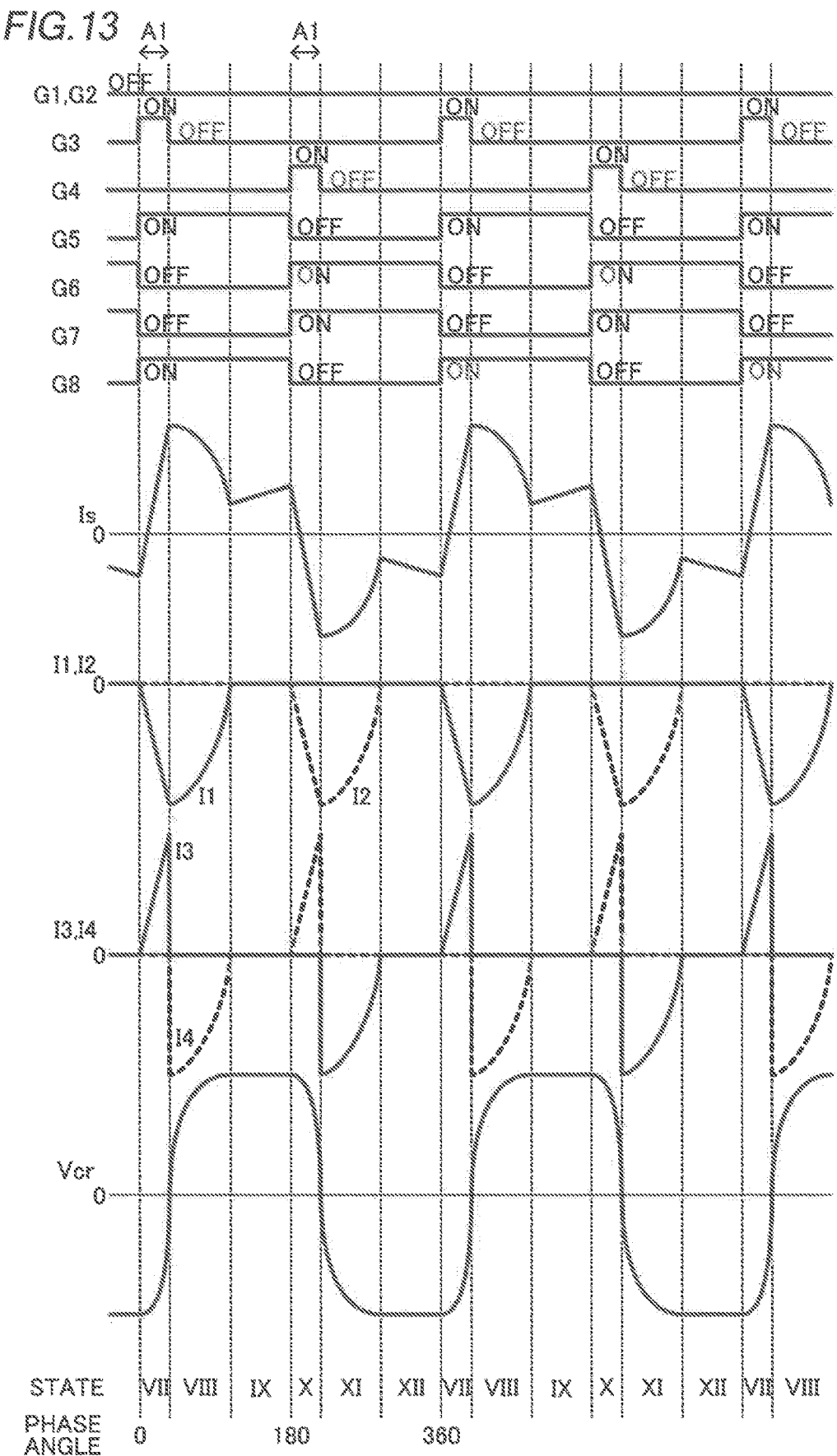
FIG. 13 is a time chart for illustrating the operation of the power conversion device at the time of stepping up a voltage according to the embodiment.

As shown in FIG. 13, in the step-up operation, the first upper arm 11 and the first lower arm 12 of the first bridge circuit 1 are turned off. That is, the gates G1 and G2 are constantly turned off. The third upper arm 21 and the third lower arm 22 are alternately turned on and off at a duty ratio of 0.5. That is, the gate G5 is turned on when the phase angle is from 0 degrees to 180 degrees, and is turned off when the phase angle is from 180 degrees to 360 degrees (=0 degrees). The gate G6 is turned off when the phase angle is from 0 degrees to 180 degrees, and is turned on when the phase angle is from 180 degrees to 360 degrees (=0 degrees).

The fourth upper arm 23 and the fourth lower arm 24 are alternately turned on and off at a duty ratio of 0.5. The fourth upper arm 23 is turned on and off with a delay of 180 degrees with respect to the third upper arm 21. The fourth lower arm 24 is turned on and off with a delay of 180 degrees with respect to the third lower arm 22. That is, the gate G7 is turned off when the phase angle is from 0 degrees to 180 degrees, and is turned on when the phase angle is from 180 degrees to 360 degrees (=0 degrees). The gate G8 is turned on when the phase angle is from 0 degrees to 180 degrees, and is turned off when the phase angle is from 180 degrees to 360 degrees (=0 degrees).

The duty ratios of the second upper arm 13 and the second lower arm 14 of the first bridge circuit 1 are controlled such that the second upper arm 13 and the second lower arm 14 are turned on and off. The duty ratios of the second upper arm 13 and the second lower arm 14 are equal to each other.

The second upper arm 13 is turned on in synchronization with rising of the third upper arm 21 or falling of the third lower arm 22. The second lower arm 14 is turned on in synchronization with rising of the fourth lower arm 24 or falling of the fourth upper arm 23. That is, the gate G3 is turned on during A1 from the phase angle of 0 degrees. The gate G4 is turned on during A1 from the phase angle of 180 degrees.

The duty ratios (periods of A1) of the second upper arm 13 and the second lower arm 14 are adjusted such that the output voltage is controlled. As the duty ratios (periods of A1) of the second upper arm 13 and the second lower arm 14 increase, the periods of time of a state VII and a state XI become longer, and the amplitude of the voltage Vcr of the resonance capacitor 16 increases. In the state II and the state V, a voltage obtained by adding the voltage of the resonance capacitor 16 to a voltage generated in the transformer 3 is applied to a smoothing circuit such that the output voltage is increased.

As shown in FIG. 14, in the state VII, the first bridge circuit 1 is a current circuit in which a current passes through the transformer 3, the first upper arm 11, the second upper arm 13, and the resonance capacitor 16. The second bridge circuit 2 is a current circuit in which a current passes through the transformer 3, the fourth lower arm 24, the smoothing capacitor 25, and the third upper arm 21. In this case, as shown in FIG. 13, the current Is that flows through the second bridge circuit 2 increases. The current I1 that flows through the first upper arm 11 decreases. The current I2 that flows through the first lower arm 12 is 0. The current I3 that flows through the second upper arm 13 increases. The current I4 that flows through the second lower arm 14 is 0. The voltage Vcr of the resonance capacitor 16 increases.

As shown in FIG. 15, in a state VIII, the first bridge circuit 1 is a current circuit in which a current passes through the transformer 3, the first upper arm 11, the smoothing capacitor 15, the second lower arm 14, and the resonance capacitor 16. The second bridge circuit 2 is a current circuit in which a current passes through the transformer 3, the fourth lower arm 24, the smoothing capacitor 25, and the third upper arm 21. In this case, as shown in FIG. 13, the current Is that flows through the second bridge circuit 2 decreases. The current I1 that flows through the first upper arm 11 increases. The current I2 that flows through the first lower arm 12 is 0. The current I3 that flows through the second upper arm 13 is 0. The current I4 that flows through the second lower arm 14 increases. The voltage Vcr of the resonance capacitor 16 increases.

Figure 16:
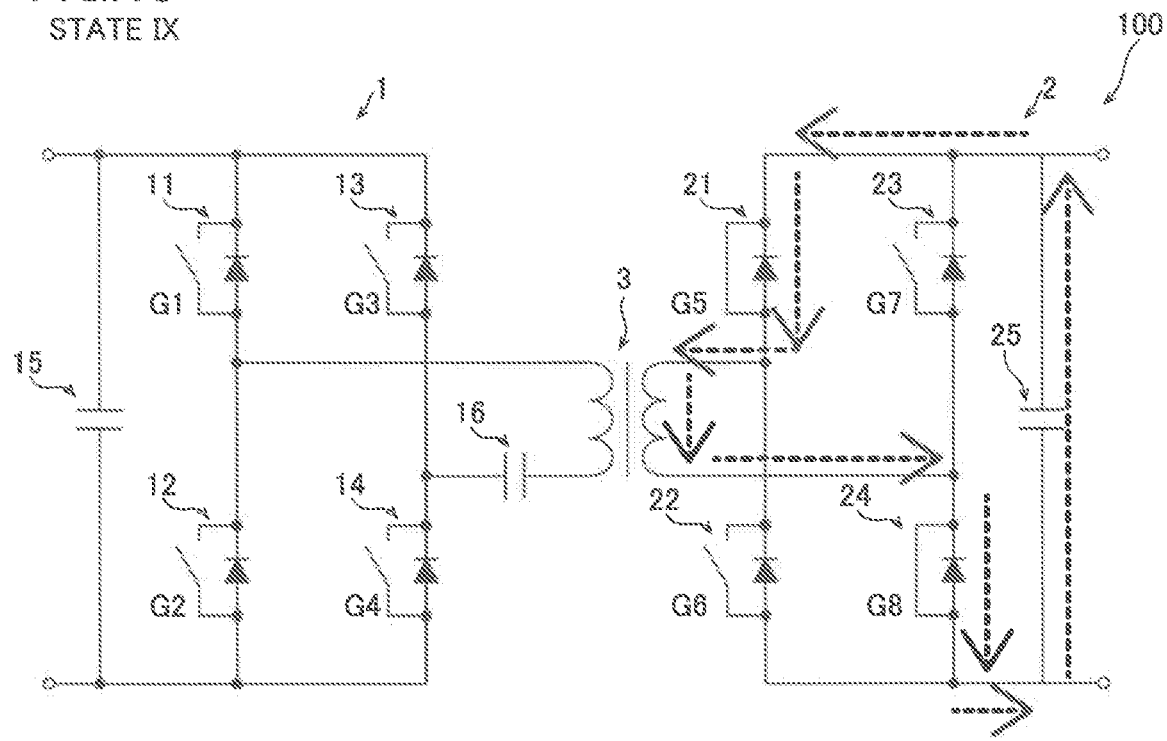
FIG. 16 is a circuit diagram showing a current path in the state IX of the power conversion device according to the embodiment.

As shown in FIG. 16, in a state IX, no current flows through the first bridge circuit 1. The second bridge circuit 2 is a current circuit in which a current passes through the transformer 3, the fourth lower arm 24, the smoothing capacitor 25, and the third upper arm 21. In this case, as shown in FIG. 13, the current Is that flows through the second bridge circuit 2 increases. The current I1 that flows through the first upper arm 11 is 0. The current I2 that flows through the first lower arm 12 is 0. The current I3 that flows through the second upper arm 13 is 0. The current I4 that flows through the second lower arm 14 is 0. The voltage Vcr of the resonance capacitor 16 is constant.

Figure 17:
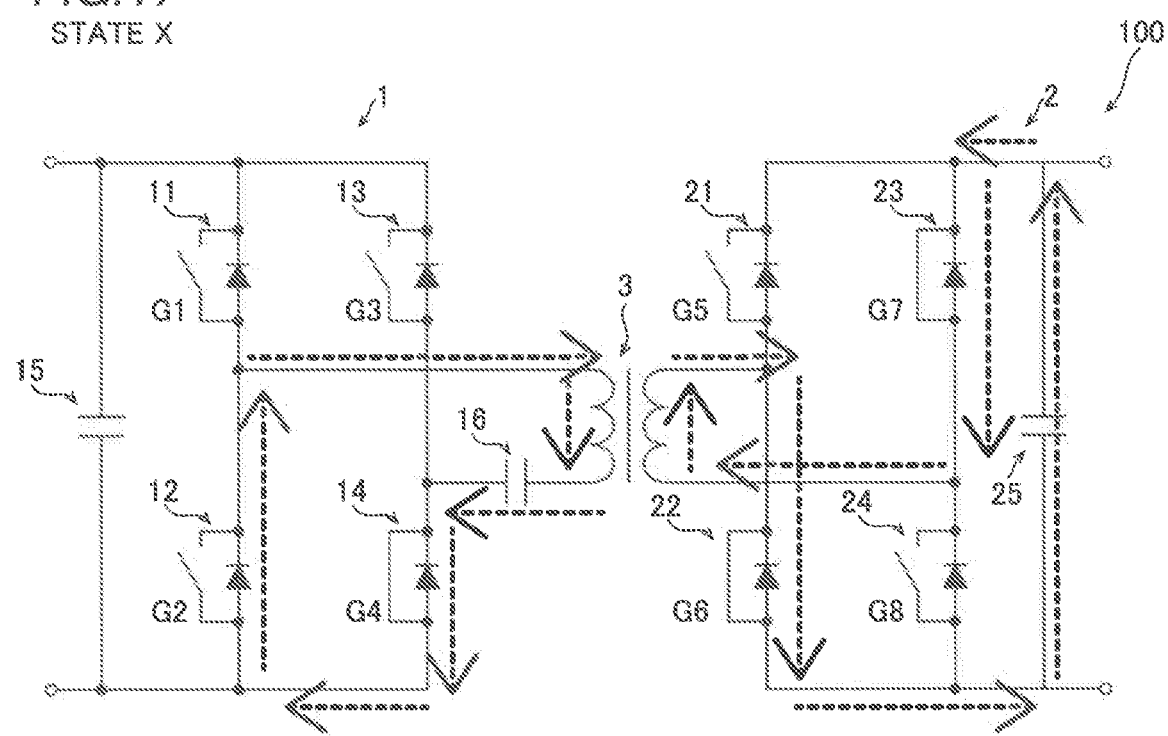
FIG. 17 is a circuit diagram showing a current path in the state X of the power conversion device according to the embodiment.

As shown in FIG. 17, in a state X, the first bridge circuit 1 is a current circuit in which a current passes through the transformer 3, the resonance capacitor 16, the second lower arm 14, and the first lower arm 12. The second bridge circuit 2 is a current circuit in which a current passes through the transformer 3, the third lower arm 22, the smoothing capacitor 25, and the fourth upper arm 23. In this case, as shown in FIG. 13, the current Is that flows through the second bridge circuit 2 decreases. The current I1 that flows through the first upper arm 11 is 0. The current I2 that flows through the first lower arm 12 decreases. The current I3 that flows through the second upper arm 13 is 0. The current I4 that flows through the second lower arm 14 increases. The voltage Vcr of the resonance capacitor 16 decreases.

As shown in FIG. 18, in the state XI, the first bridge circuit 1 is a current circuit in which a current passes through the transformer 3, the resonance capacitor 16, the second upper arm 13, the smoothing capacitor 15, and the first lower arm 12. The second bridge circuit 2 is a current circuit in which a current passes through the transformer 3, the third lower arm 22, the smoothing capacitor 25, and the fourth upper arm 23. In this case, as shown in FIG. 13, the current Is that flows through the second bridge circuit 2 increases. The current I1 that flows through the first upper arm 11 is 0. The current I2 that flows through the first lower arm 12 increases. The current I3 that flows through the second upper arm 13 increases. The current I4 that flows through the second lower arm 14 is 0. The voltage Vcr of the resonance capacitor 16 decreases.

As shown in FIG. 19, in a state XII, no current flows through the first bridge circuit 1. The second bridge circuit 2 is a current circuit in which a current passes through the transformer 3, the third lower arm 22, the smoothing capacitor 25, and the fourth upper arm 23. In this case, as shown in FIG. 13, the current Is that flows through the second bridge circuit 2 decreases. The current I1 that flows through the first upper arm 11 is 0. The current I2 that flows through the first lower arm 12 is 0. The current I3 that flows through the second upper arm 13 is 0. The current I4 that flows through the second lower arm 14 is 0. The voltage Vcr of the resonance capacitor 16 is constant.

Advantageous Effects of this Embodiment

According to this embodiment, the following advantageous effects are achieved.

According to this embodiment, as described above, the power conversion device 100 includes the controller 4 configured to perform a control to alternately turn on the second upper arm 13 and the second lower arm 14 of the first bridge circuit 1 such that the on-times thereof do not overlap each other to increase the power stored in the resonance capacitor 16 of the first bridge circuit 1 in a state in which the first leg 1a of the first bridge circuit 1 is turned off when transmitting power from the second bridge circuit 2 to the first bridge circuit 1 and performing the step-up operation. Accordingly, switching of the first bridge circuit 1 is controlled such that the step-up operation can be performed when power is transmitted from the second bridge circuit 2 to the first bridge circuit 1, and thus it is not necessary to provide a resonance capacitor and a switching circuit that switches the use of the resonance capacitor in the second bridge circuit 2. Consequently, the step-up operation can be performed when power is transmitted from the second bridge circuit 2 to the first bridge circuit 1 while a complex circuit configuration is significantly reduced or prevented.

According to this embodiment, as described above, the controller 4 is configured to control the on-time of the second upper arm 13 of the first bridge circuit 1 and the on-time of the second lower arm 14 of the first bridge circuit 1 when transmitting power from the second bridge circuit 2 to the first bridge circuit 1 and performing the step-up operation. Accordingly, the on-time of the second upper arm 13 of the first bridge circuit 1 and the on-time of the second lower arm 14 of the first bridge circuit 1 are increased such that the power stored in the resonance capacitor 16 of the first bridge circuit 1 can be increased. Thus, the on-time of the second upper arm 13 of the first bridge circuit 1 and the on-time of the second lower arm 14 of the first bridge circuit 1 are controlled such that the value of the stepped-up voltage output from the first bridge circuit 1 can be easily controlled.

According to this embodiment, as described above, the controller 4 is configured to adjust the on-time of the second upper arm 13 of the first bridge circuit 1 and the on-time of the second lower arm 14 of the first bridge circuit 1 based on the error between the output voltage of the first bridge circuit 1 and the target voltage. Accordingly, the on-time of the second upper arm 13 of the first bridge circuit 1 and the on-time of the second lower arm 14 of the first bridge circuit 1 are adjusted such that the output voltage of the first bridge circuit 1 becomes the target voltage, and thus the output voltage of the first bridge circuit 1 can be easily brought close to the target voltage.

According to this embodiment, as described above, the controller 4 is configured to, when transmitting power from the second bridge circuit 2 to the first bridge circuit 1 and performing the step-up operation, turn off the second upper arm 13 and the second lower arm 14 of the first bridge circuit 1 such that the off-times thereof overlap each other and store power in the smoothing capacitor 15 provided in parallel to the first leg 1a and the second leg 1b of the first bridge circuit 1. Accordingly, excessive power accumulation in the resonance capacitor 16 of the first bridge circuit 1 is significantly reduced or prevented such that the stepped-up voltage output from the first bridge circuit 1 can be easily set to a desired value.

According to this embodiment, as described above, the controller 4 is configured to, when transmitting power from the second bridge circuit 2 to the first bridge circuit 1 and performing the step-up operation, perform a control to invert and alternately turn on and off the third upper arm 21 and the third lower arm 22 of the second bridge circuit 2 and invert and alternately turn on and off the fourth upper arm 23 and the fourth lower arm 24 of the second bridge circuit 2, and to turn on the second upper arm 13 of the first bridge circuit 1 in synchronization with the turn-on of the third upper arm 21 and turn on the second lower arm 14 of the first bridge circuit 1 in synchronization with the turn-on of the third lower arm 22. Accordingly, currents in different directions can be alternately passed through the transformer 3, and thus unlike a case in which a current is passed through the transformer 3 in only one direction, the step-up operation can be performed when power is continuously transmitted from the second bridge circuit 2 to the first bridge circuit 1.

According to this embodiment, as described above, the controller 4 is configured to, when transmitting power from the second bridge circuit 2 to the first bridge circuit 1 and performing the step-up operation, perform a control to set the duty ratios of the third upper arm 21 and the third lower arm 22 of the second bridge circuit 2 to 0.5 to invert and alternately turn on and off the third upper arm 21 and the third lower arm 22, and to set the duty ratios of the fourth upper arm 23 and the fourth lower arm 24 of the second bridge circuit 2 to 0.5 to turn on the fourth upper arm 23 in synchronization with the turn-on of the third lower arm 22 and turn on the fourth lower arm 24 in synchronization with the turn-on of the third upper arm 21. Accordingly, the time to pass a current through the transformer 3 in different directions can be equal, and thus a current is passed through the transformer 3 in a balanced manner such that the step-up operation can be stably and continuously performed.

According to this embodiment, as described above, the controller 4 is configured to, when transmitting power from the second bridge circuit 2 to the first bridge circuit 1 and performing the step-down operation, perform the step-down operation by turning on the third upper arm 21 and the fourth upper arm 23 of the second bridge circuit 2 such that the on-times thereof overlap each other and turning on the third lower arm 22 and the fourth lower arm 24 of the second bridge circuit 2 such that the on-times thereof overlap each other to decrease the power stored in the resonance capacitor 16 of the first bridge circuit 1. Accordingly, switching of the first bridge circuit 1 and switching of the second bridge circuit 2 are controlled in both the step-up operation and the step-down operation, and thus the switching timing is controlled such that the step-up operation and the step-down operation can be seamlessly performed.

According to this embodiment, as described above, the controller 4 is configured to, when transmitting power from the second bridge circuit 2 to the first bridge circuit 1 and performing the step-up operation, make the on-time of the second upper arm 13 of the first bridge circuit 1 same as the on-time of the second lower arm 14 of the first bridge circuit 1 and control switching of the second upper arm 13 and the second lower arm 14. Accordingly, the power stored in the resonance capacitor 16 by turning on the second upper arm 13 and the power stored in the resonance capacitor 16 by turning on the second lower arm 14 can be substantially equal to each other, and thus the step-up operation can be stably performed using the second upper arm 13 and the second lower arm 14.

Modified Examples

The embodiment disclosed this time must be considered as illustrative in all points and not restrictive. The scope of the present invention is not shown by the above description of the embodiment but by the scope of claims for patent, and all modifications (modified examples) within the meaning and scope equivalent to the scope of claims for patent are further included.

For example, while the power conversion device is mounted on an electric vehicle in the aforementioned embodiment, the present invention is not restricted to this. For example, the power conversion device may alternatively be fixedly provided indoors or outdoors without being mounted on a moving body such as an electric vehicle.

While the power conversion device is mounted on an electric vehicle in the aforementioned embodiment, the present invention is not restricted to this. For example, the power conversion device may alternatively be mounted on a hybrid vehicle driven by electricity and an engine or a fuel-cell vehicle that generates power by a fuel cell. Furthermore, the in-vehicle power conversion device may alternatively be mounted on a train.

While the power conversion device includes the resonance capacitor in the first bridge circuit in the aforementioned embodiment, the present invention is not restricted to this. In the present invention, a resonance reactor may alternatively be provided in series with the resonance capacitor in the first bridge circuit.

What is claimed is:
1. A power conversion device comprising:
   a first bridge circuit including a first leg including a first upper arm and a first lower arm, a second leg including a second upper arm and a second lower arm, and a resonance capacitor provided between the first leg and the second leg;

a second bridge circuit connected to the first bridge circuit via a transformer; and a controller configured to control switching of the first bridge circuit and the second bridge circuit, wherein the controller is configured to alternately turn on the second upper arm and the second lower arm of the first bridge circuit such that on-periods thereof do not overlap each other to increase power stored in the resonance capacitor of the first bridge circuit in a state in which the first leg of the first bridge circuit is turned off when transmitting power from the second bridge circuit to the first bridge circuit and performing step-up operation, wherein the controller is configured to control at least one of the on-period of the second upper arm of the first bridge circuit and the on-period of the second lower arm of the first bridge circuit when the second upper arm and the second lower arm are turned on alternately to perform the step-up operation, wherein the controller is configured to control the on-period of the second upper arm of the first bridge circuit and the on-period of the second lower arm of the first bridge circuit when performing the step-up operation, and wherein the controller is configured to, when transmitting the power from the second bridge circuit to the first bridge circuit and performing the step-up operation, turn off the second upper arm and the second lower arm of the first bridge circuit such that off-times thereof overlap each other, and store the power in a smoothing capacitor provided in parallel to the first leg and the second leg of the first bridge circuit.

2. The power conversion device according to claim 1, wherein the second bridge circuit includes a third leg including a third upper arm and a third lower arm, and a fourth leg including a fourth upper arm and a fourth lower arm; and the controller is configured to, when transmitting the power from the second bridge circuit to the first bridge circuit and performing the step-up operation, perform a control to invert and alternately turn on and off the third upper arm and the third lower arm of the second bridge circuit, and invert and alternately turn on and off the fourth upper arm and the fourth lower arm of the second bridge circuit.

3. The power conversion device according to claim 2, wherein the controller is configured to, when transmitting the power from the second bridge circuit to the first bridge circuit and performing the step-up operation, perform a control to set duty ratios of the third upper arm and the third lower arm of the second bridge circuit to 0.5 to invert and alternately turn on and off the third upper arm and the third lower arm, and to set duty ratios of the fourth upper arm and the fourth lower arm of the second bridge circuit to 0.5 to turn on the fourth upper arm in synchronization with the turn-on of the third lower arm and turn on the fourth lower arm in synchronization with the turn-on of the third upper arm.

4. The power conversion device according to claim 2, wherein the controller is configured to, when transmitting the power from the second bridge circuit to the first bridge circuit and performing step-down operation, perform the step-down operation by turning on the third upper arm and the fourth upper arm of the second bridge circuit such that on-periods thereof overlap each other and turning on the third lower arm and the fourth lower arm of the second bridge circuit such that on-periods thereof overlap each other to decrease the power stored in the resonance capacitor of the first bridge circuit.

5. The power conversion device according to claim 1, wherein the controller is configured to output gate signals based on an output voltage and a voltage command value to control switching of the first bridge circuit and the second bridge circuit, and includes a subtractor, an error amplifier, a limiter, and a pulse generator.

6. The power conversion device according to claim 5, wherein the subtractor subtracts a voltage measurement value from the voltage command value and outputs an error therebetween to the error amplifier; a signal output from the error amplifier is input to the limiter which outputs, to the pulse generator, a signal to control a phase angle misalignment; and then, the pulse generator generates the gate signals.

7. The power conversion device according to claim 1, wherein the controller is configured to control at least one of the on-period of the second upper arm of the first bridge circuit and the on-period of the second lower arm of the first bridge circuit based on an error between an output voltage of the first bridge circuit and a target voltage when performing the step-up operation.

8. A power conversion device comprising:

a first bridge circuit including a first leg including a first upper arm and a first lower arm, a second leg including a second upper arm and a second lower arm, and a resonance capacitor provided between the first leg and the second leg;

a second bridge circuit connected to the first bridge circuit via a transformer; and a controller configured to control switching of the first bridge circuit and the second bridge circuit, wherein the controller is configured to alternately turn on the second upper arm and the second lower arm of the first bridge circuit such that on-periods thereof do not overlap each other to increase power stored in the resonance capacitor of the first bridge circuit in a state in which the first leg of the first bridge circuit is turned off when transmitting power from the second bridge circuit to the first bridge circuit and performing step-up operation, wherein the controller is configured to control at least one of the on-period of the second upper arm of the first bridge circuit and the on-period of the second lower arm of the first bridge circuit when the second upper arm and the second lower arm are turned on alternately to perform the step-up operation, wherein the controller is configured to control the on-period of the second upper arm of the first bridge circuit and the on-period of the second lower arm of the first bridge circuit when performing the step-up operation, and wherein the controller is configured to, when transmitting the power from the second bridge circuit to the first bridge circuit and performing the step-up operation, make the on-period of the second upper arm of the first bridge circuit same as the on-period of the second lower arm of the first bridge circuit and control switching of the second upper arm and the second lower arm.

* * * * *